United States Patent [19]

Card

[11] 4,171,165
[45] Oct. 16, 1979

[54] CELLULOSE INSULATION STORAGE BIN WITH IMPROVED DEBRIDGER

[75] Inventor: David C. Card, Denver, Colo.

[73] Assignee: Diamond Insulation Industries, Inc., Denver, Colo.

[21] Appl. No.: 924,950

[22] Filed: Jul. 17, 1978

[51] Int. Cl.² ............................ B01F 7/08; B01F 7/20; B01F 15/02

[52] U.S. Cl. .................................. 366/186; 366/292; 366/325; 222/236; 366/143; 366/309

[58] Field of Search ............. 366/603, 292, 186, 195, 366/196, 295, 294, 325; 222/236, 227

[56] References Cited

U.S. PATENT DOCUMENTS

| | | | |
|---|---|---|---|
| 1,152,820 | 9/1915 | Kennicott | 222/236 |
| 3,129,927 | 4/1964 | Mast | 366/603 |
| 3,133,727 | 5/1964 | Luscombe | 366/603 |
| 3,183,553 | 5/1965 | Slater | 366/186 |
| 3,804,377 | 4/1974 | Kugle | 366/603 |

Primary Examiner—Robert W. Jenkins
Attorney, Agent, or Firm—Sheridan, Ross, Fields & McIntosh

[57] ABSTRACT

An improved debridger is provided in one or more storage bins in a cellulose insulation manufacturing plant which minimizes the bridging of the cellulose insulation across the storage bins between an inlet at the top thereof and an auger-fed outlet at the lower end thereof. The debridger comprises a vertical rotatable shaft having a plurality of horizontally extending arms for agitating the insulation and minimizing bridging. The arms or vanes on the auger vary in length and are removable from the vertical shaft for installation of the shaft in the bins. The shaft is rotatably driven by power means located outside of the storage bin.

14 Claims, 16 Drawing Figures

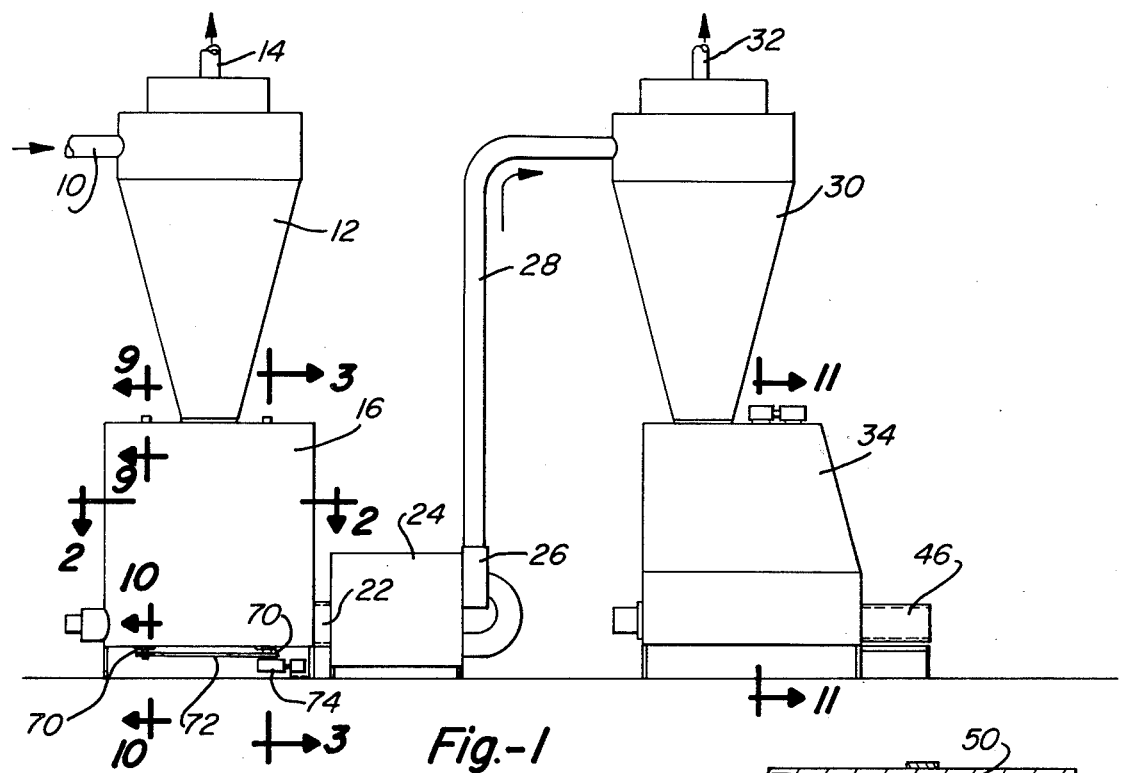
Fig.-1
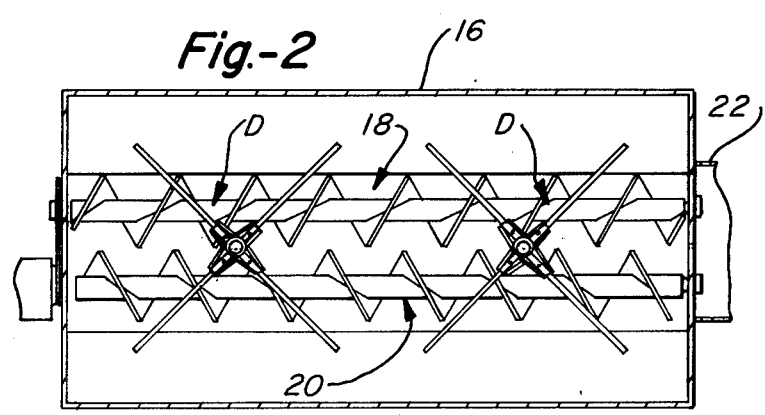
Fig.-2
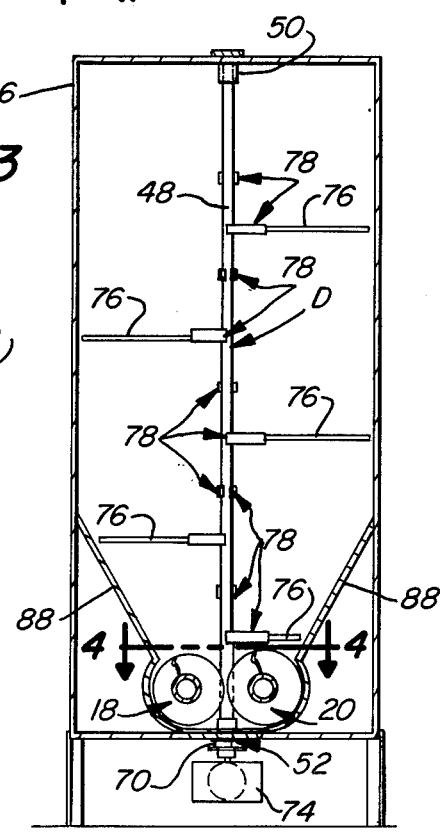
Fig.-3
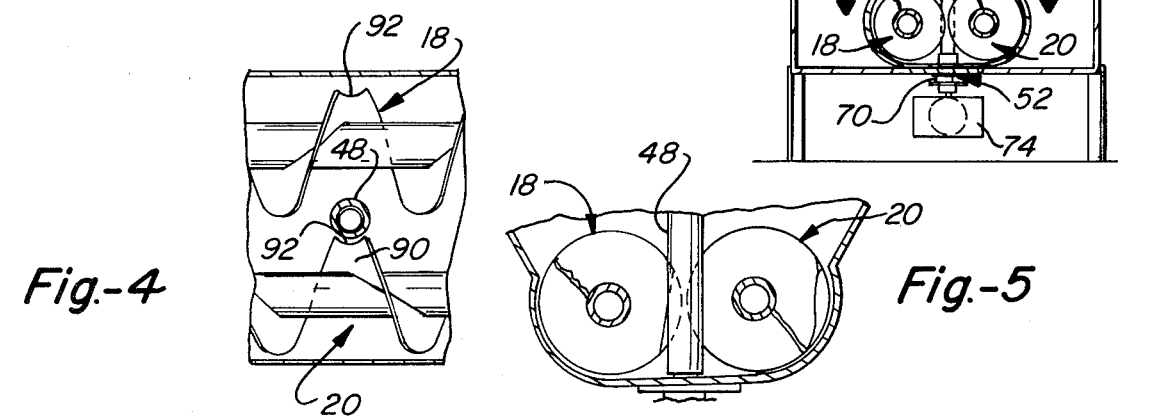
Fig.-4
Fig.-5

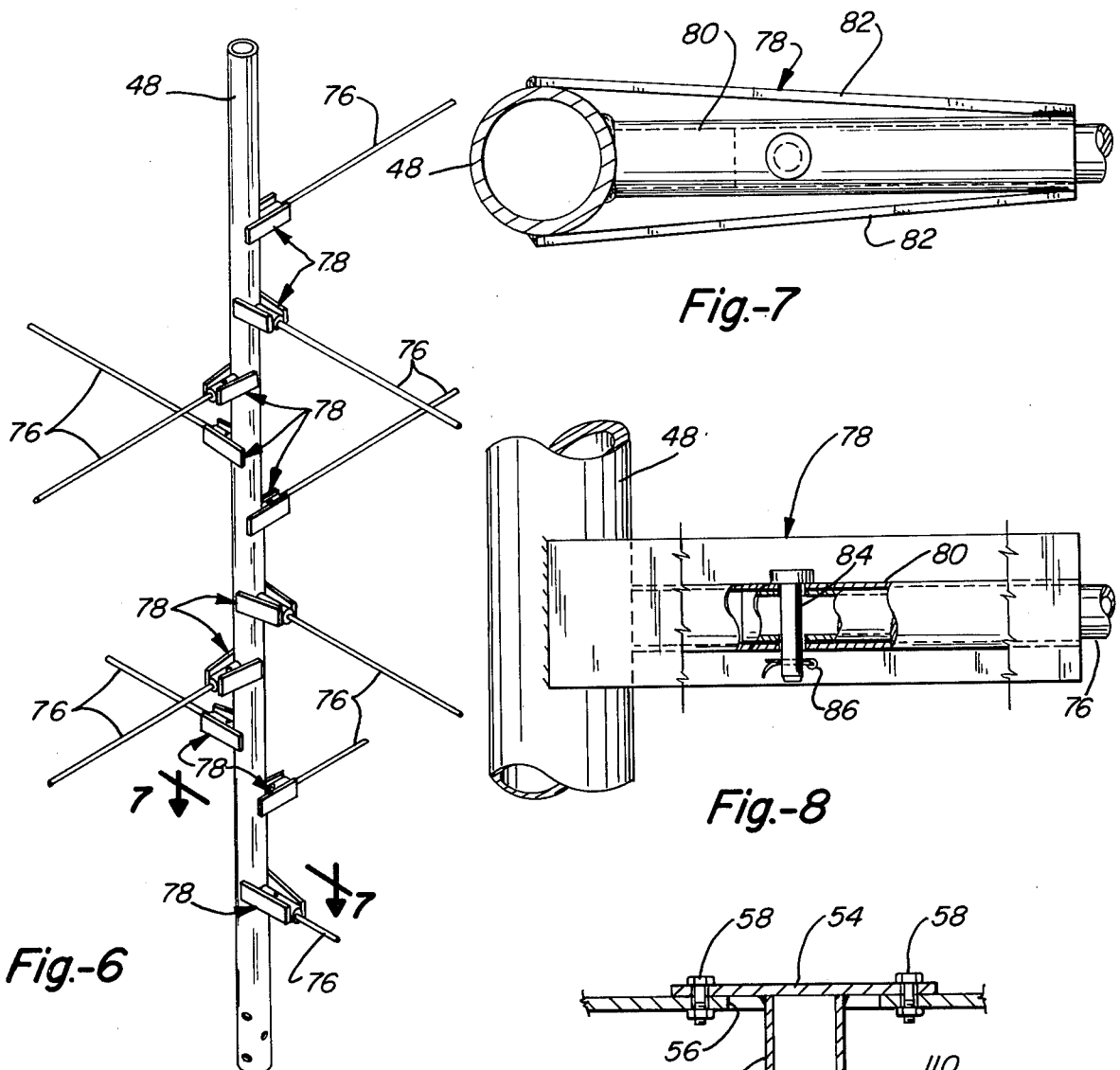
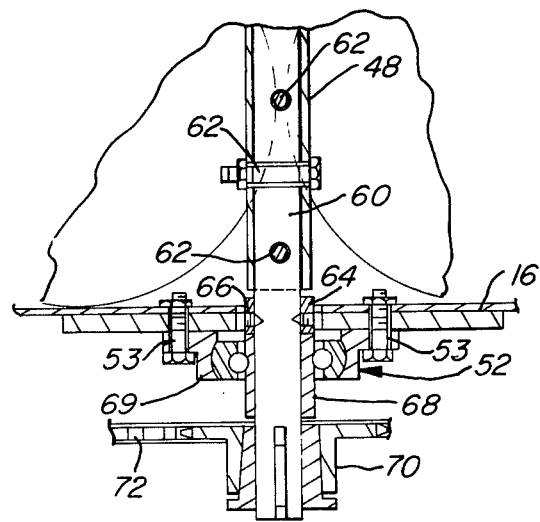
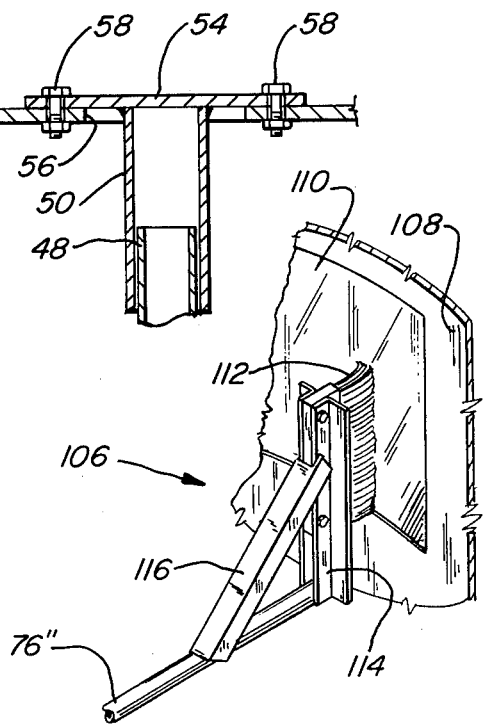

CELLULOSE INSULATION STORAGE BIN WITH IMPROVED DEBRIDGER

CROSS REFERENCE TO RELATED APPLICATIONS

This application is an improvement over commonly assigned copending U.S. application Ser. No. 822,232, filed Aug. 5, 1977, entitled "Improved Method and Apparatus for Making Cellulose Insulation" by Robert J. Taylor et al.

BACKGROUND OF THE INVENTION

1. Field of the Invention

This invention relates to an improved debridger, and more particularly to a debridger for minimizing the bridging of cellulose insulation within storage bins in a cellulose insulation manufacturing plant.

2. Description of the Prior Art

In a typical cellulose insulation plant, bundled paper, such as newspaper, is passed through a shredder and then is fed by a blower to a cyclone which separates the dust particles and feeds the cellulose into the top of a surge bin or storage bin where it falls by gravity to the bottom to be fed by augers through an outlet to a second grinder. At this point, chemical fire retardants are usually added to the cellulose after which it is fed to a second cyclone which separates further dust particles and then feeds the treated cellulose into the top of a storage bin or bagging bin where it falls by gravity to the bottom thereof and is fed by auger means into the bags.

It is at these storage bins, such as the surge bin and the bagging bin, where cellulose often bridges across the bin because of its light, fluffy nature and its affinity for other cellulose particles. This bridging prevents further downward feeding and causes the augers to be undersupplied with cellulose, thereby interfering with the efficiency of the plant operation. Various types of apparatus have been devised for feeding the cellulose from the top of the bin to the bottom so that it does not bridge across the bin. One such debridging apparatus is disclosed in the above-mentioned U.S. Ser. No. 822,232. In this device, a horizontally mounted rotor assembly is provided in each bin. The rotor has two arms extending outwardly from the axis at the sides of the bin which are interconnected at opposite ends by a transverse, tightly stretched wire. The rotor is constantly rotated causing the wires on each end of the arms to move up along the sides of the bin and then across the top and the bottom, respectively, and down the opposite sides. While this apparatus decreases the bridging of the cellulose across the bin, it is not entirely satisfactory. One reason for this is that the wires mainly move along the sides of the bin and across the top and bottom, but leave the central area untouched and, therefore, bridging can occur within the area circumscribed by the wires.

SUMMARY OF THE INVENTION

In accordance with this invention, a debridger is provided in a hopper having an upper inlet and lower outlet. The hopper includes at least one auger at the bottom thereof for moving cellulose insulation through the outlet. The debridger includes a series of horizontal vanes mounted for rotation around a vertical shaft, the vanes being spaced along the axis between the inlet and the outlet. Means are also provided for rotatably driving the shaft to rotate the vanes about the shaft.

More particularly, the debridger includes a plurality of vertically spaced blades or vanes on one or more vertical shafts, said blades being mounted between the inlet and the outlet and the shaft extending between a pair of spaced augers at the outlet. The vanes are removable from the shaft for removal of the shaft from the hopper. In one embodiment, the shaft is driven from the bottom of the hopper and in another embodiment it is driven from the top of the hopper. In each case the shaft is held in a suspended position by means of a fixed collar supported by a bearing. The other end of the shaft is received in a collar or sleeve bearing and in one embodiment has an opening therein to allow insulation which gets into the collar to be removed, providing a self-cleaning action. The length of the vanes varies with the width or diameter of the bins. In addition, in one embodiment a portion of the auger flights is cut away for receiving the shafts which support the arms of the debridger. In still a further embodiment, a cleaning device, such as a brush, can be provided on the end of one or more of the debridger arms for cleaning a window in the side of the hopper so that the level of the cellulose insulation within the hopper can be viewed.

Advantageously, the arrangement of the debridger vanes spaced within the hoppers or storage bins between the inlet and outlet thereof causes agitation of cellulose insulation in substantially all areas of the storage chamber or bin, thereby assuring that bridging of the insulation across the bin will not occur or if it does occur, will be broken up quickly. Thus, a more efficient cellulose insulation plant can be provided.

Additional advantages of this invention will become apparent from the description which follows, taken in conjunction with the accompanying drawings.

BRIEF DESCRIPTION OF THE DRAWINGS

FIG. 1 is a side elevation of a portion of a cellulose insulation manufacturing plant showing a surge bin, a final grinder and a bagging bin;

FIG. 2 is an enlarged horizontal section, taken along line 2—2 of FIG. 1, showing the arrangement of a pair of debridgers within the surge bin;

FIG. 3 is an enlarged vertical section, taken along line 3—3 of FIG. 1, showing further details of a debridger within the surge bin;

FIG. 4 is an enlarged horizontal section, taken along line 4—4 of FIG. 3, showing cut-out portions on the augers so that they will clear the shaft of the debridger;

FIG. 5 is an enlarged fragmentary elevation of augers of FIG. 3, showing further details of the auger flights and the shaft for one of the debridgers;

FIG. 6 is an enlarged perspective view of one of the debridgers shown in FIGS. 2 and 3;

FIG. 7 is a greatly enlarged horizontal section, taken along line 7—7 of FIG. 6, showing the connection of a vane of the debridger to the shaft;

FIG. 8 is a side perspective view of the connection shown in FIG. 7, partially broken away, showing further details thereof;

FIG. 9 is a greatly enlarged vertical section, taken along line 9—9 of FIG. 1, showing the sleeve bearing construction for the debridger;

FIG. 10 is a greatly enlarged vertical section, taken along line 10—10 of FIG. 1, showing the ball bearing support and drive connection for the debridger shaft;

FIG. 16 is a fragmentary perspective view of an alternative bin having a circular configuration and provided with a brush on the end of a vane of the debridger for cleaning a window in the bin as the vane rotates for viewing the level of the cellulose insulation therein.

DESCRIPTION OF THE PREFERRED EMBODIMENTS

Figure 11:
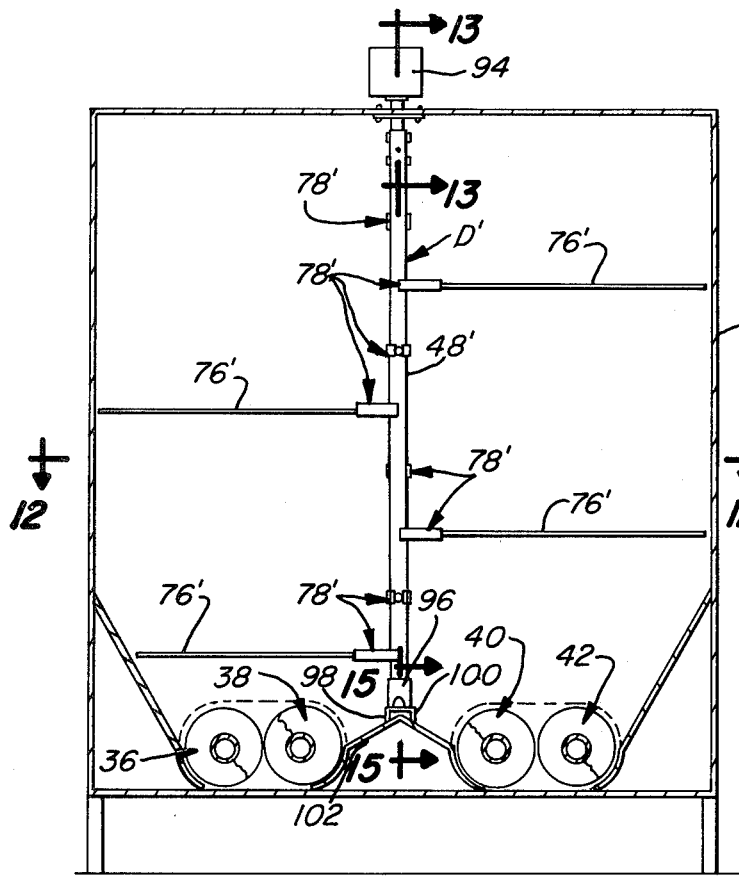
FIG. 11 is an enlarged vertical section, taken along line 11—11 of FIG. 1, showing the arrangement of a debridger within the bagging bin.

A side elevation is shown in FIG. 1 of a portion of a cellulose insulation plant incorporating the improvement of this invention. A complete plant is shown in more details in commonly assigned copending U.S. application Ser. No. 822,232, filed Aug. 5, 1977 and is hereby incorporated by reference. Conveniently, bundled newspaper or the like is fed through an appropriate first shredder (not shown) which converts the paper into cellulose insulation. This insulation is fed to an inlet 10 in cyclone 12. The dust is separated from the cellulose material and removed through an exhaust 14. The cellulose insulation is collected in a first storage hopper or surge bin 16. In accordance with this invention, surge bin 16 is provided with a pair of debridgers D as best seen in FIGS. 2 and 3 which assure that the material falls from cyclone 12 down to augers 18 and 20 at the bottom of the hopper as shown.

The cellulose insulation is then fed by augers 18 and 20 through a conduit 22 into a fine grinder 24 which further grinds the cellulose material and it is at this point that fire retardant chemicals are usually added. The cellulose is then fed by means of a blower 26 through a conduit 28 into a second cyclone 30 where dust is separated through exhaust 32 and the insulation is collected in a second storage hopper or bagging bin 34.

Figure 12:
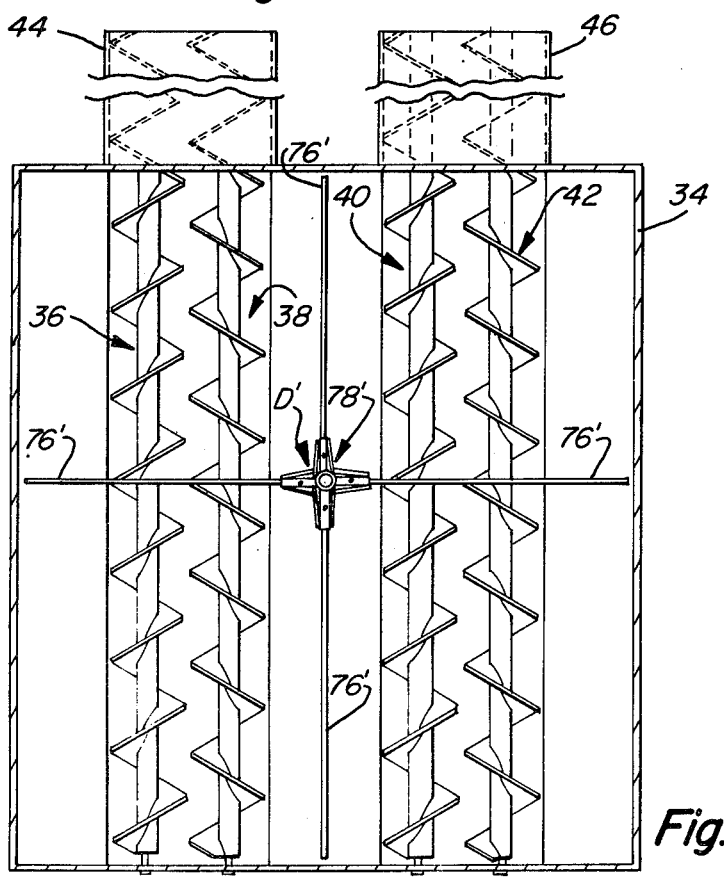
FIG. 12 is a horizontal section, taken along line 12—12 of FIG. 11, showing the arrangement of the debridger between the augers.
Figure 13:
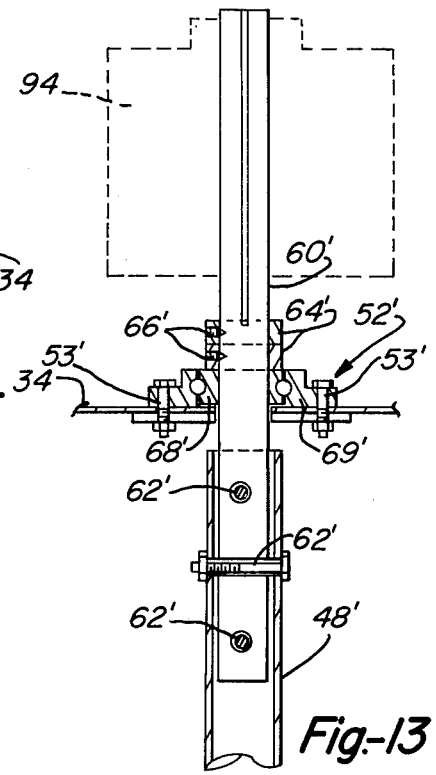
FIG. 13 is a greatly enlarged vertical section, taken along line 13—13 of FIG. 11, showing a drive connection for the debridger.

As best seen in FIGS. 11 and 12, the bagging bin 34 is provided with a debridger D' which minimizes the bridging of the material across the bin 34 so that it falls down onto the pairs of bagging augers, such as augers 36 and 38 and augers 40 and 42. The insulation is then fed from the augers into discharge or loading chutes 44 and 46 respectively, where it is fed into bags.

Looking at FIG. 3, each debridger D comprises a vertical shaft 48 whose upper end is supported in a sleeve bearing 50 and the lower end is supported in a lower ball bearing 52, which is attached to the bottom of bin 16, as by bolts 53. As best seen in FIG. 9, the upper sleeve bearing is attached to a cover plate 54, as by welding which covers an opening 56 which is substantially greater in diameter than the diameter of shaft 50 to allow insertion and removal of the shaft and its associated parts, as more fully described below. The cover plate 54 is secured to the top of the bin by simple fastening means, such as nuts 58.

As best seen in FIG. 10, a stub shaft 60 is received in the end of shaft 48 and is held in place by a plurality of bolts 62 extending therethrough in transverse directions, as shown. The stub shaft 60 extends through an opening in the bottom of bin 16 and has a collar 64 attached thereto by means of one or more set screws 66. The collar supports the shaft on the inner race 68 of ball bearing 52. The outer race 59 is held stationary while the inner race, which is slidably received over the end of stub shaft 60, rotates with the shaft as it is driven, as described below.

A sprocket 70 is attached to the bottom of the shaft and is inter-connected with a sprocket 70 on the bottom of the other debridger shaft by means of a chain 72 as seen in both FIGS. 1 and 9. The debridgers are then driven by a motor 74 suitably connected to the end of one of the sprocket shafts, as best viewed in FIG. 1. Conveniently, the motor drives the shafts at a relatively slow rate, such as two revolutions per minute, which is satisfactory to minimize debridging across the hopper.

A plurality of vanes or arms 76 are removably attached to socket connections 78 spaced axially along shaft 48 and angularly spaced thereabout as shown in FIG. 6.

As best seen in FIGS. 7 and 8, socket connections 78 each include a tubular socket 80 having one end attached to shaft 48, as by welding and supported by a pair of opposed plates 82, each of which has one end welded to shaft 48 and the other end welded to the outer end of socket 80. Conveniently, socket 80 is of greater diameter than arm or vane 76 so that the end of the vane can be removably received in the socket. The vane is held in place by means of a pin 84 which is secured with a cotter pin 86, as seen in FIG. 8. Thus, the vanes can be removed for cleaning or for removing the debridger from surge bin 16. Also, as best seen in FIG. 3, the length of vane 76 varies, being longer at the upper end of the bin where it is widest and narrower at the lower portion so that the vanes sweep across the entire area of the bin but are spaced slightly from the walls or outer surfaces of the bin. In this regard, the lower vanes 76 are shorter so as to clear sloping side walls 88 which terminate adjacent augers 18 and 20.

Conveniently, the flights 90 of the augers each have a cut-out portion or notch 92 to accomodate shaft 48 where it extends between the augers and through the bottom wall of bin 16.

Now turning to FIGS. 11-15, the debridger D' for bagging bin 34 is quite similar to that previously described. However, post 48' is essentially inverted or turned end for end from the position of post 48 so that stub shaft 60' extends from the upper end thereof and is held in place by transverse bolts 62'. In this embodiment, the shaft is supported at its upper end by means of one or more collars 64' which are fixedly held in place on shaft 48' by means of set screws 66'. A collar 64' bears against the inner race 68' of a bearing 52' whose outer race 69' is bolted to the top wall of bin 34, as by bolts 53' shown in FIG. 13. The shaft is rotatably driven by means of a motor 94 mounted on top of the bin.

Figure 14:
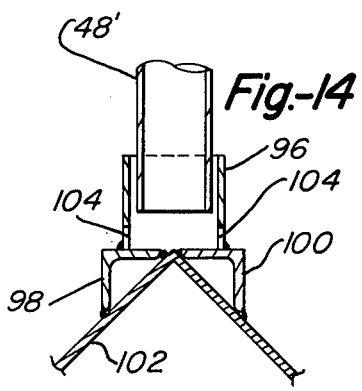
FIG. 14 is a vertical section taken along line 14—14 of FIG. 15 showing details of the trunnion arrangement for supporting the bottom of the debridger shaft.
Figure 15:
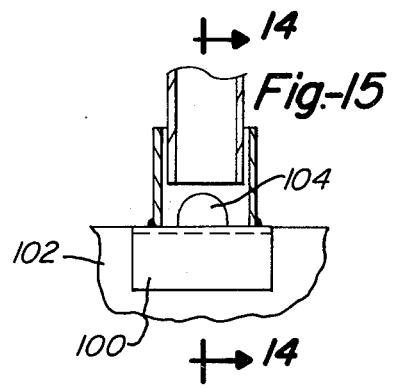
FIG. 15 is a greatly enlarged vertical section, taken along line 15—15 of FIG. 11, showing the trunnion arrangement for supporting the bottom of the debridger shaft.

The lower end of shaft 48' is supported in a sleeve bearing 96 which is attached as by welding to angle irons 98 and 100 which are in turn attached by welding to an inverted V-shaped portion 102 at the bottom of hopper 34. Conveniently, as best seen in FIGS. 14 and 15, the lower end of sleeve 106 is provided with passageways 104 on opposite sides thereof which serves as outlets for any cellulose insulation which gets into the bearing between the side of shaft 48' and the bearing 96.

As in the surge bin, the vanes 76' are removable from socket connections 78' for cleaning or for removing of the debridger D' from the apparatus for shipment or maintenance purposes.

Both the surge bin and the sacking bin have been illustrated as being generally rectangular or square in configuration. However, it may be desirable to make them in a cylindrical configuration such as bin 106 shown in FIG. 17 having a cylindrical sidewall 108. Conveniently, the side wall is provided with a window 110 for viewing the level of the cellulose insulation within the bin. Advantageously, vane 76" may be provided at its outer end with a wiper or brush 112. This brush is mounted on a vertical arm 114 attached to the post, as by welding, and maintained in vertical position by angle bracket 116. In operation, insulation will tend to collect on the windows so that it is impossible to see into the interior of the bin to view the level of the insulation. With brush 112 attached to the end of the vane which is nearest the window, it is possible to clean the window on each revolution of the vane on the debridger which will afford the operator a view of the interior of the bin.

From the foregoing, the advantages of this invention are readily apparent. A debridging apparatus has been provided which is of simple construction and can easily be installed or removed from a surge bin or a bagging bin. The debridger is provided with removable arms or vanes which extend outwardly across the area of the bin and rotate with the central shaft of the debridger causing a sweeping action through the area of the debridger to settle the cellulose to the bottom thereof and prevent bridging so that the cellulose moves from the inlet at the top to the augers at the bottom and can be moved by the augers on to the next operation. This results in a more efficient operation in that the feeding of material from the bottom of the bins will be substantially continuous.

The invention has been described in detail with particular reference to preferred embodiments thereof, but it will be understood that variations and modifications can be effected within the spirit and scope of the invention.

What is claimed is:

1. A storage bin for temporary storage of cellulose insulation, said bin comprising:
    a hopper having an upper end and a lower end;
    an inlet at said upper end for receiving cellulose insulation;
    an outlet at said lower end for supplying insulation to the next operation;
    an auger at the bottom of said hopper for feeding insulation in said hopper through said outlet;
    a vertical shaft mounted in said hopper for rotation;
    a plurality of rotatable vanes spaced along said shaft and angularly displaced from each other so that said vanes sweep across substantially the entire cross-sectional area of said hopper to minimize bridging of the insulation across said hopper as it falls from said inlet down to said outlet;
    a plurality of sleeves, each of said sleeves having an inner and outer end, said inner end being attached to said shaft for removably receiving one of said vanes; and
    a removable pin extendable through each of said vanes for removably connecting said vane to said sleeve.

2. A storage bin as claimed in claim 1, further including:
    a stub shaft removably connected to one end of said vertical shaft and extending through said hopper to the exterior thereof;
    a collar removably attached to said shaft;
    a ball bearing having an outer race fixedly attached to said hopper and an inner race for supporting said collar and shaft for rotation with said inner race; and
    drive means connected to said stub shaft for rotating said shaft and said vanes.

3. A storage bin, as claimed in claim 2, further including
    a sleeve bearing having one end attached to a support member connected to the hopper, the other end rotatably receiving said shaft.

4. A storage bin, as claimed in claim 3, wherein said support member includes:
    a plate bolted across an opening in the top of the hopper for removal of said shaft.

5. A storage bin, as claimed in either claim 1 or claim 2, wherein:
    said vanes are removably connected to said shaft.

6. A storage bin, as claimed in claim 1, further including:
    a pair of braces attached at one end to said shaft and attached at the other end to an outer end of each of said sleeves for supporting said sleeves.

7. A storage bin, as claimed in claim 1, further including:
    a cut-out portion in each flight of said auger to provide clearance for said shaft.

8. A storage bin for temporary storage of cellulose insulation, said bin comprising:
    a hopper having an upper end and a lower end;
    an inlet at said upper end for receiving cellulose insulation;
    an outlet at said lower end for supplying insulation to the next operation;
    an auger at the bottom of said hopper for feeding insulation in said hopper through said outlet;
    a debridger having a vertical shaft mounted in said hopper for rotation; and
    a plurality of vanes spaced along said shaft and angularly displaced from each other;
    a stub shaft removably connected to one end of said vertical shaft and extending through said hopper to the exterior thereof;
    a collar removably attached to said shaft;
    a ball bearing having an outer race fixedly attached to said hopper and an inner race for supporting said collar and shaft for rotation with said inner race;
    drive means connected to said stub shaft for rotating said shaft and said vanes so that said vane means sweep across substantially the entire cross sectional area of said hopper to minimize bridging of the insulation across said hopper as it falls from said inlet down to said outlet;
    a sleeve attached at an inner end to said shaft for removably receiving each vane;
    a removable pin extendable through each said sleeve and said vane for removably connecting said vane to said sleeve;
    a pair of braces attached at one end to said shaft and attached at the other end to an outer end of each of said sleeves for supporting said sleeves; and a sleeve bearing having one end attached to a support member connected to the hopper, the other end rotatably receiving said shaft.

9. A storage bin, as claimed in claim 8, wherein said support member includes:
a plate bolted across an opening in the top of the hopper for removal of said shaft.

10. A storage bin, as claimed in claim 8, wherein said support member includes:
a pair of angle irons attached to the bottom of said hopper; and
at least one opening in the lower end of said sleeve adjacent said angle irons for removal of insulation which gets in said sleeve bearing.

11. A storage bin for temporary storage of cellulose insulation, said bin comprising:
a hopper having an upper end and a lower end;
an inlet at said upper end for receiving cellulose insulation;
an outlet at said lower end for supplying insulation to the next operation;
an auger having a plurality of flights at the bottom of said hopper for feeding insulation in said hopper through said outlet;
a vertical shaft mounted in said hopper for rotation;
a plurality of rotatable vanes spaced along said shaft and angularly displaced from each other so that said vanes sweep across substantially the entire cross-sectional area of said hopper to minimize bridging of the insulation across said hopper as it falls from said inlet down to said outlet; and
a cut-out portion in each flight of said auger to provide clearance for said shaft.

12. A storage bin for temporary storage of cellulose insulation, said bin comprising:
a hopper having an upper end and a lower end;
an inlet at said upper end for receiving cellulose insulation;
an outlet at said lower end for supplying insulation to the next operation;
an auger at the bottom of said hopper for feeding insulation in said hopper through said outlet;
a vertical shaft mounted in said hopper for rotation;
a plurality of rotatable vanes spaced along said shaft and angularly displaced from each other so that said vanes sweep across substantially the entire cross-sectional area of said hopper to minimize bridging of the insulation across said hopper as it falls from said inlet down to said outlet;
a plurality of sleeves, each of said sleeves having an inner and outer end, said inner end being attached to said shaft for removably receiving one of said vanes; and
fastening means for removably connecting said vanes to said sleeve.

13. A storage bin for temporary storage of cellulose insulation, said bin comprising:
a hopper having an upper end and a lower end;
an inlet at said upper end for receiving cellulose insulation;
an outlet at said lower end for supplying insulation to the next operation;
an auger at the bottom of said hopper for feeding insulation in said hopper through said outlet;
a vertical shaft mounted in said hopper for rotation; and
a plurality of vertically spaced rotatable vanes connected to said shaft throughout a substantial portion of said bin so that said vanes sweep across substantially the entire cross-sectional area of said hopper to minimize bridging of the insulation across said hopper as it falls from said inlet down to said outlet, said vanes extending outwardly generally perpendicularly from said shaft and said vanes adjacent the bottom of said bin having a shorter length than said vanes adjacent the top of said bin.

14. A storage bin for temporary storage of cellulose insulation, said bin comprising:
a hopper having an upper end and a lower end;
an inlet at said upper end for receiving cellulose insulation;
an outlet at said lower end for supplying insulation to the next operation;
an auger having a plurality of flights at the bottom of said hopper for feeding insulation in said hopper through said outlet;
a vertical shaft mounted in said hopper for rotation;
a plurality of rotatable vanes spaced along said shaft and angularly displaced from each other so that said vanes sweep across substantially the entire cross-sectional area of said hopper to minimize bridging of the insulation across said hopper as it falls from said inlet down to said outlet;
a stub shaft removably connected to one end of said vertical shaft and extending through said hopper to the exterior thereof;
a pair of angle irons attached to the bottom of said hopper; and
a sleeve bearing having one end attached to said pair of angle irons, the other end rotatably receiving said vertical shaft, said sleeve bearing heaving at least one opening in the lower end thereof adjacent said angle irons for removal of insulation which gets in said sleeve bearing.

* * * * *